Aug. 22, 1933.    W. A. HULL    1,923,729
TUNNEL KILN
Filed Oct. 12, 1931    7 Sheets-Sheet 1
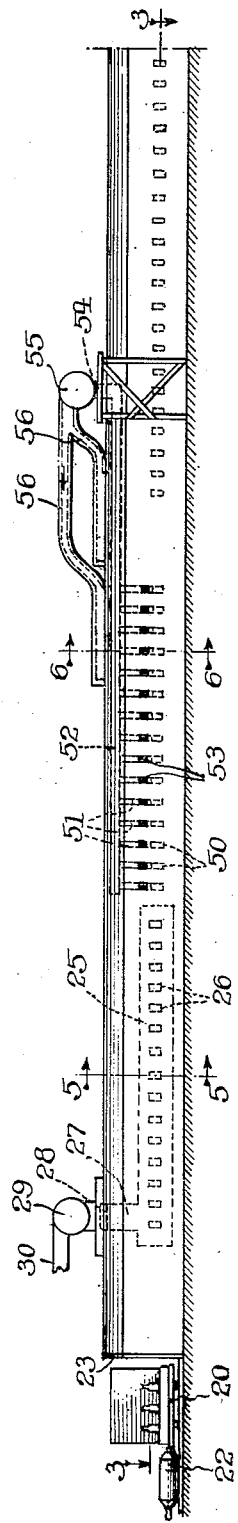
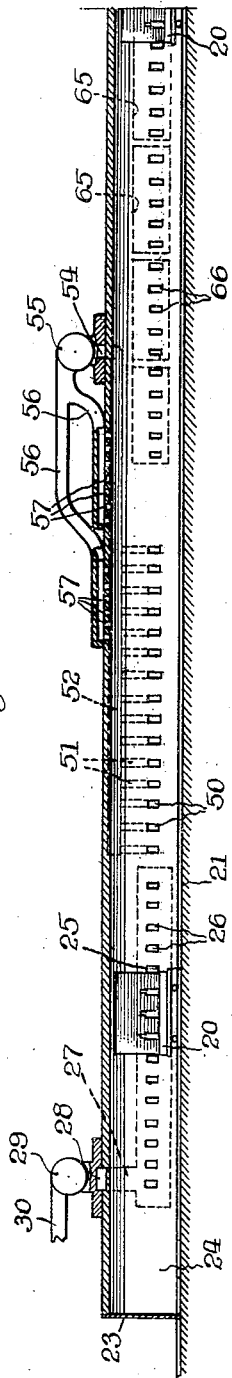
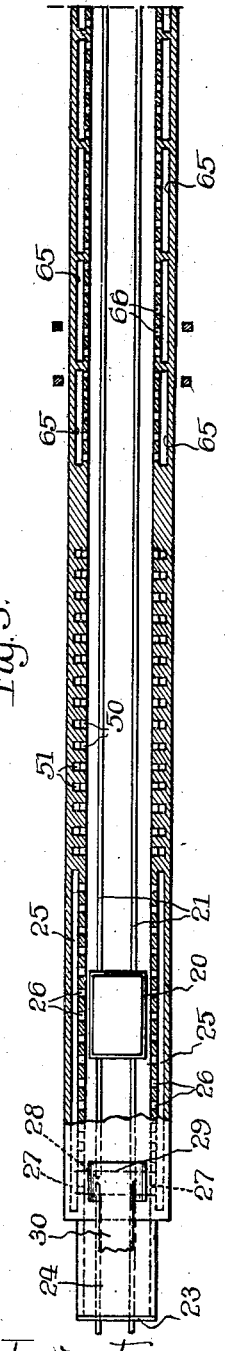
Inventor,
Walter A. Hull, Aug. 22, 1933. W. A. HULL 1,923,729
TUNNEL KILN
Filed Oct. 12, 1931 7 Sheets-Sheet 2
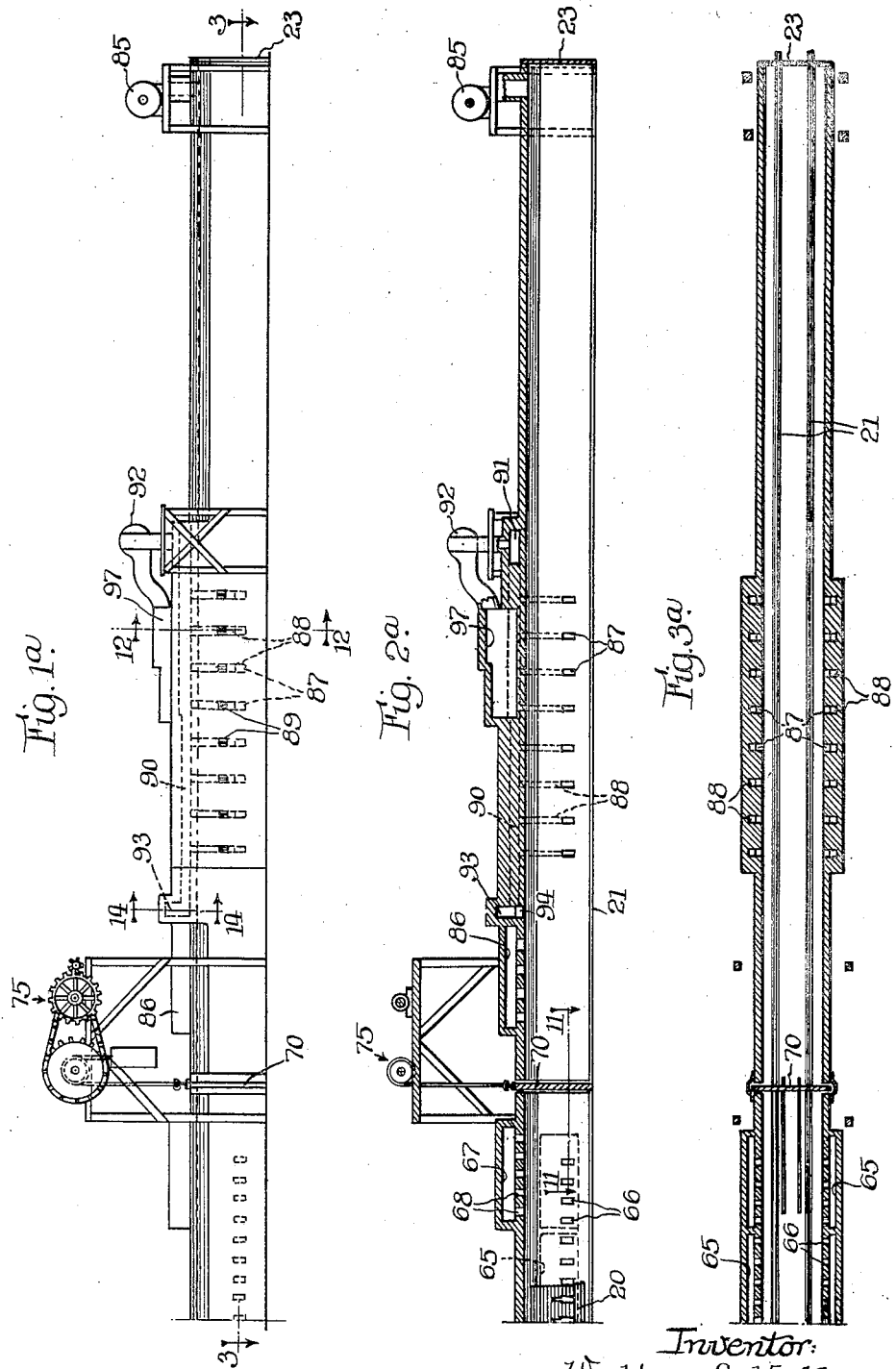
Inventor:
Walter A. Hull,
By Lindahl Parker Carlson,
Attys.

Aug. 22, 1933.      W. A. HULL      1,923,729
TUNNEL KILN
Filed Oct. 12, 1931      7 Sheets-Sheet 3

Inventor:
Walter A. Hull,
By Gindell Parker Carlson
Attys.

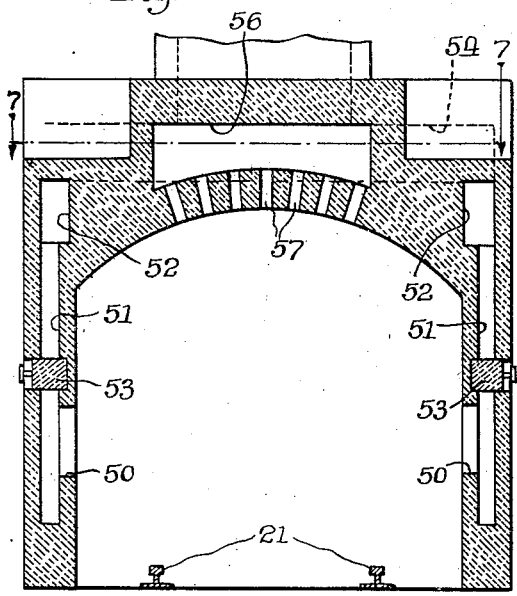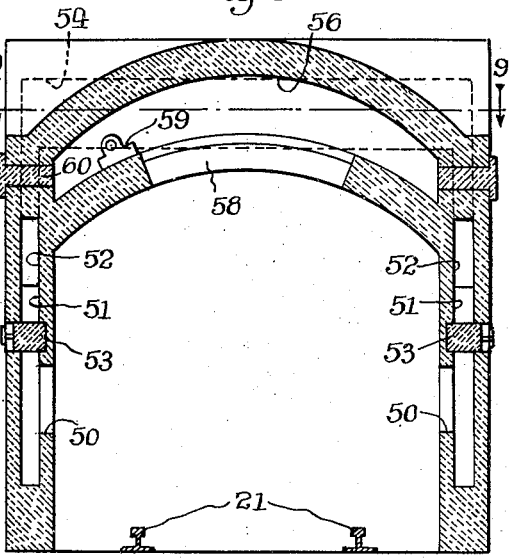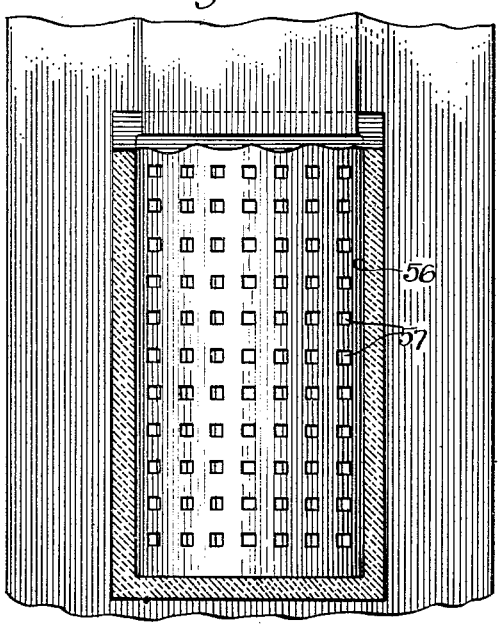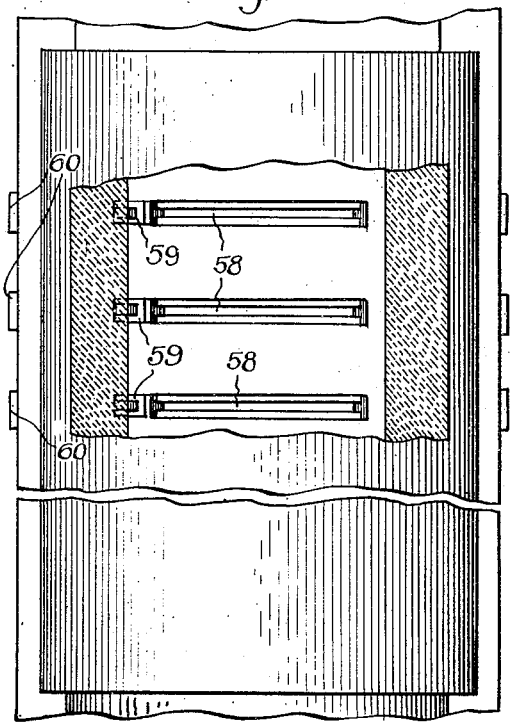

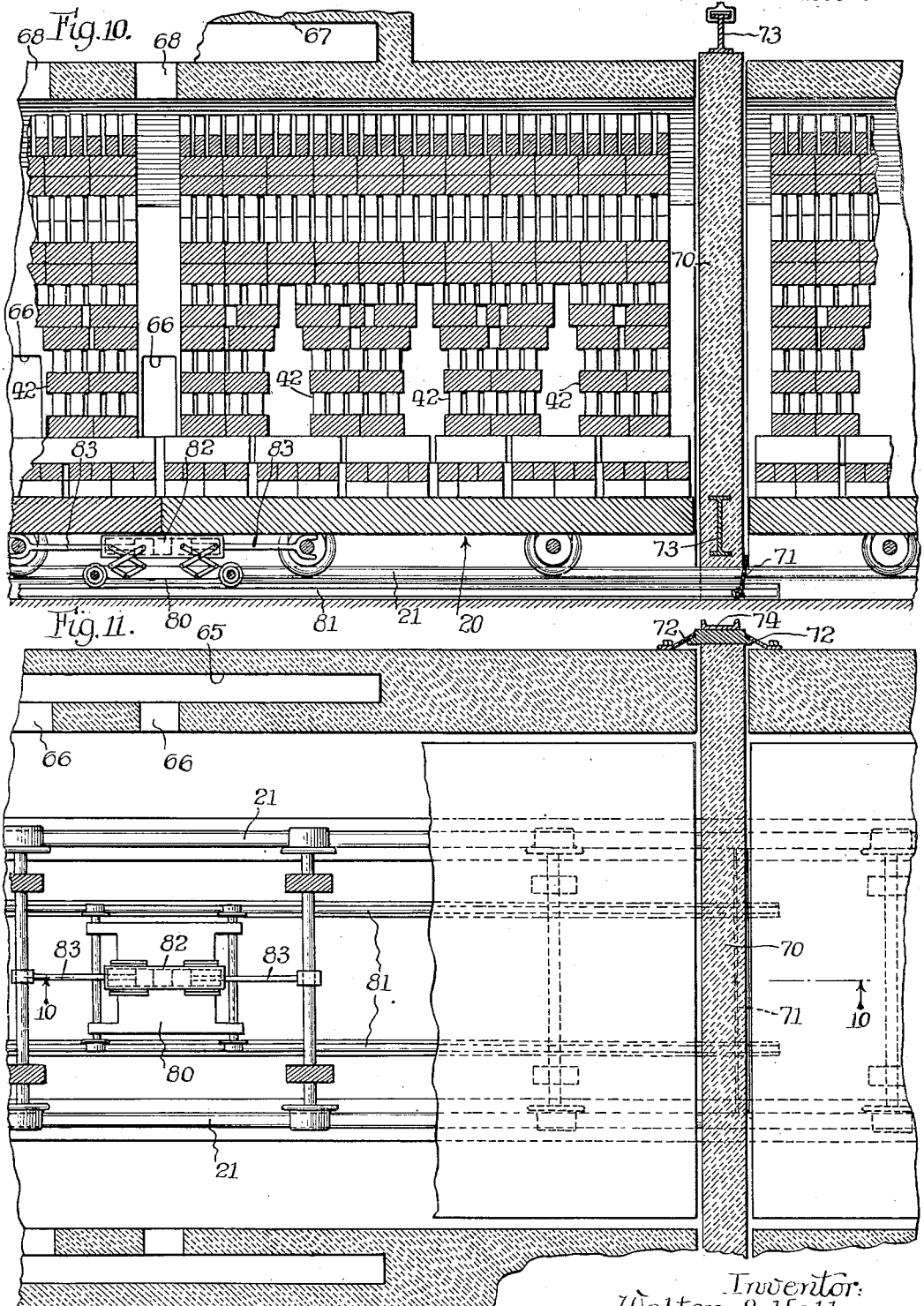

Aug. 22, 1933.  W. A. HULL  1,923,729
TUNNEL KILN
Filed Oct. 12, 1931  7 Sheets-Sheet 6

Inventor:
Walter A. Hull,
By Ginasche Parker & Carlway
Attys.

Aug. 22, 1933.   W. A. HULL   1,923,729
TUNNEL KILN
Filed Oct. 12, 1931    7 Sheets-Sheet 7

Inventor:
Walter A. Hull,
By Gindell Parker & Carlson
Attys.

Patented Aug. 22, 1933

1,923,729

UNITED STATES PATENT OFFICE 1,923,729

TUNNEL KILN

Walter A. Hull, Oak Park, Ill.

Application October 12, 1931. Serial No. 568,274

51 Claims. (Cl. 25—142)

The invention relates generally to kilns for treating clay wares and other products requiring similar treatment and more particularly to the type known as tunnel kilns in which all the different steps of the process of treatment are simultaneously occurring but in different parts of the kiln, the ware being moved through the kiln so that when it is removed therefrom it has been completely treated.

The general object of the invention is to provide a tunnel kiln capable of burning more ware in proportion to the cost of the kiln and in proportion to the cost of operating the kiln than has heretofore been possible.

Another object is to provide a kiln of this type which permits of greater control of the temperatures at critical points in the kiln.

A further object is to provide a kiln of this type in which the difference in temperature between the ends of certain zones within the kiln may be reduced to prevent too rapid temperature changes in the ware in said zones.

A still further object is to provide a kiln of this type in which there is no great temperature difference between the top and bottom of the ware passage at any one point in the kiln.

Another object is to provide a kiln of this type having a portion in which the ware remains a sufficient length of time to complete the oxidation thereof without slowing down the linear rate of movement of the ware and without undergoing too great a change in temperature, but with a rapid circulation of air therein to effect such oxidation.

Another object is to provide a kiln of this type in which the temperature in the cooling zone is so controlled that during the period when the ware is undergoing large dimensional changes, it is subjected to a reduced rate of temperature drop.

Still another object is to provide a kiln of this type in which the heat in the burning zone reaches all parts of the ware at any one point in the kiln substantially at the same time so that all parts of said ware are equally and simultaneously affected.

Another object is to provide a kiln having means for completely isolating the burning zone from the cooling zone thus permitting more efficient operation and control of both of said zones and decreasing the length of the kiln by eliminating a transitional portion between said zones.

Another object is to provide a kiln having such isolating means together with a novel device for moving the ware from the burning zone to the cooling zone and for maintaining a gap in the ware carrying means for the insertion of said isolating means.

Another object is to provide a novel method of treating ware in a tunnel kiln.

Other objects and advantages will become apparent from the following description taken in connection with the accompanying drawings in which:

Figures 1 and 1ª are fragmentary side elevations of a kiln embodying the features of the invention, the two figures when placed end to end showing the entire kiln.

Figs. 2 and 2ª are vertical sections taken respectively through the center lines of the elevations shown in Figs. 1 and 1ª.

Figs. 3 and 3ª are horizontal sections taken on the lines 3—3 of Figs. 1 and 1ª respectively.

Fig. 6 is an enlarged vertical cross section taken on the line 6—6 of Fig. 1.

Fig. 7 is a fragmentary horizontal section taken on the line 7—7 of Fig. 6.

Fig. 8 is a vertical cross section similar to Fig. 6 but of a modification thereof.

Fig. 9 is a fragmentary horizontal section taken on the line 9—9 of Fig. 8.

Fig. 10 is a fragmentary vertical section taken on the line 10—10 of Fig. 11.

Fig. 11 is an enlarged fragmentary horizontal section taken on the line 11—11 of Fig. 2ª.

Tunnel kilns using fuel as a source of heat are of two fairly distinct types. In one type, commonly known as "open fire kilns", the products of combustion come into direct contact with the ware being treated. In the other type, known as "muffle kilns", the products of combustion are kept out of contact with the ware by passing them through flues and passages surrounding the ware passage through the kiln, and the heat is transferred to the ware through the walls of said flues and passages.

All features of the present invention apply to open fire kilns and the drawings illustrate a kiln of this type, but it is contemplated, and it will be obvious, that many of the features are applicable to kilns of the muffle type as well.

In burning clay products, the ware must be successively subjected to different steps or stages in the process of treatment. A tunnel kiln is arranged to provide such steps or stages in different portions or zones therein, said zones being placed in such order that the ware may be carried through the kiln at a predetermined rate of movement and be subjected to the proper treatment for a sufficient length of time in each zone.

Broadly, the process of treatment includes three steps, namely, pre-heating, burning, and cooling. However, these terms are more or less arbitrary. Thus, the step of pre-heating, has two functions, first, to drive off water retained in the clay after initial drying but not chemically combined with the clay, and second, to eliminate various combustible or oxidizable impurities such as sulphur combined with iron or sulphur associated with organic matter. These two functions must be accomplished in the order named, and may be termed respectively water-smoking and oxidation.

General description of the kiln

Figure 16:
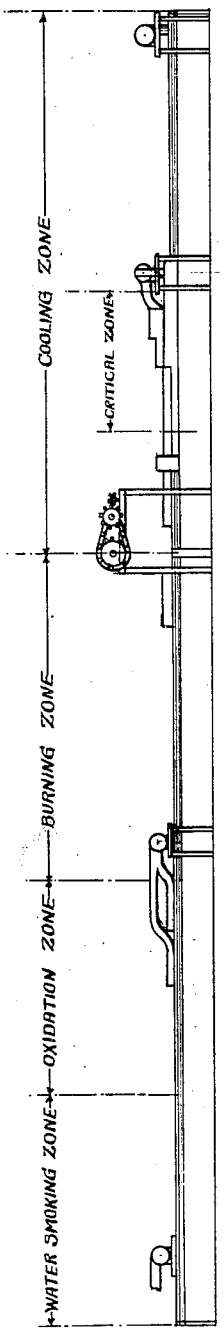
Fig. 16 is a diagrammatic view of the kiln showing the relation of the various zones.

The kiln embodying the features of the present invention may be divided, for the sake of clarity of description, into a water-smoking zone, an oxidation zone, a burning zone, and a cooling zone shown in their relation to each other in Fig. 16. However, in actual use of the kiln disclosed herein, there can be no sharp lines of division between the zones, and the function of one zone may continue to be accomplished in the first part of the next succeeding zone, or the function of the succeeding zone may start in the next preceding zone. Thus, oxidation may start while the ware is still in the water-smoking zone, and water-smoking may continue into the first part of the oxidation zone with oxidation going on at the same time.

The kiln disclosed herein comprises generally a pair of side walls spanned by an arch to form a tunnel. The ware is carried therethrough, in the present instance, by means of a train of cars 20 (see Figs. 1, 2, 3, 1a, 2a and 3a) running on rails 21 extending through the kiln. Thus, the ware passage is formed by the car tops, the side walls and arch. The train is moved through the kiln either by a means for pushing it or a means for pulling it, an hydraulic pusher 22 being employed in the present instance. The pusher 22 may also serve to introduce the cars one by one into the tunnel, a car being shown in Fig. 1 in front of the entrance of the kiln ready for introduction. At about the same time that a car is introduced, another car is pushed or pulled out of the opposite or exit end of the kiln. At the ends of the kiln, doors 23 are placed to close off the interior of the kiln, said doors being opened only at such times as is necessary to move a car into the entrance of the kiln and to push a car out through the exit end. The train is preferably moved each time a car is inserted into the kiln, so that such movement is intermittent or step by step, the movement being at a predetermined rate depending upon the time it is necessary to let the ware remain in any zone.

Water-smoking zone

As mentioned above, the ware is first carried through the water-smoking zone, the heat for said zone and also the oxidation zone being supplied by the products of combustion and an excess of air passing through said zones from the burning zone in a direction opposite to the direction of travel of the train.

Each car, on first entering the kiln, remains for a time in a small chamber 24 or vestibule formed at the end of the water-smoking zone where a preliminary heating is given to the ware. From the chamber 24, the cars are moved into the main portion of the water-smoking zone where the ware is heated sufficiently to drive off the water retained in the clay but not chemically combined therewith.

In the main portion of the water-smoking zone, means is provided for effecting a circulation of the gases therein and for withdrawing them therefrom, which means comprises a pair of longitudinally extending passages 25 (see Figs. 1, 2 and 3) built in the lower part of the respective side walls of that part of the kiln from which a plurality of spaced openings 26 extend into the lower part of the ware passage immediately over the tops of the cars 20. In some kilns, it may be preferable to construct the openings 26 below the car tops depending upon the construction of the cars. At the end of the passages 25 nearest the entrance to the kiln and farthest from the source of heat, a pair of flues 27 extend upwardly in the side walls and are connected by a cross flue 28 in the arch. To draw the gases from the ware passage through the openings 26, an exhaust fan 29 is connected to the cross flue 28 and forces the gases out through a stack, of which a portion 30 is shown.

Since the gases supplying the heat for the water-smoking zone come from the burning zone and move through the kiln in the opposite direction to the movement of the ware on the cars, the temperature at the end of the water-smoking zone adjacent the oxidation zone will be higher than at the other or entrance end. There will also tend to be a higher temperature adjacent the arch than in the lower portion of the ware passage immediately over the car tops. Since the gases are withdrawn toward the end of lower temperature and from the bottom of the ware passage, it is the cooler gases which are carried away, while the warmer gases circulate around the ware to eliminate the water therefrom.

To increase the drying effect to effect a better circulation between the upper and lower portions of the ware passage, the ware is so stacked on the cars that the gases may freely circulate through the stack of ware. Thus, spaces are provided between the different pieces of ware in the stack permitting such circulation. It is also a feature of the present invention to provide openings through the stack cooperating with the openings 26 in the side wall of the kiln affording direct communication between the openings 26 and the spaces between the pieces of ware. This form of stacking not only permits free circulation therethrough but also permits the hotter gases to be positively drawn through the stack affording a maximum drying effect.

The stack is formed in this manner not only to obtain advantages in the water-smoking zone but cooperates with the tunnel structure in the other zones as well, as will be later described.

Figure 4:
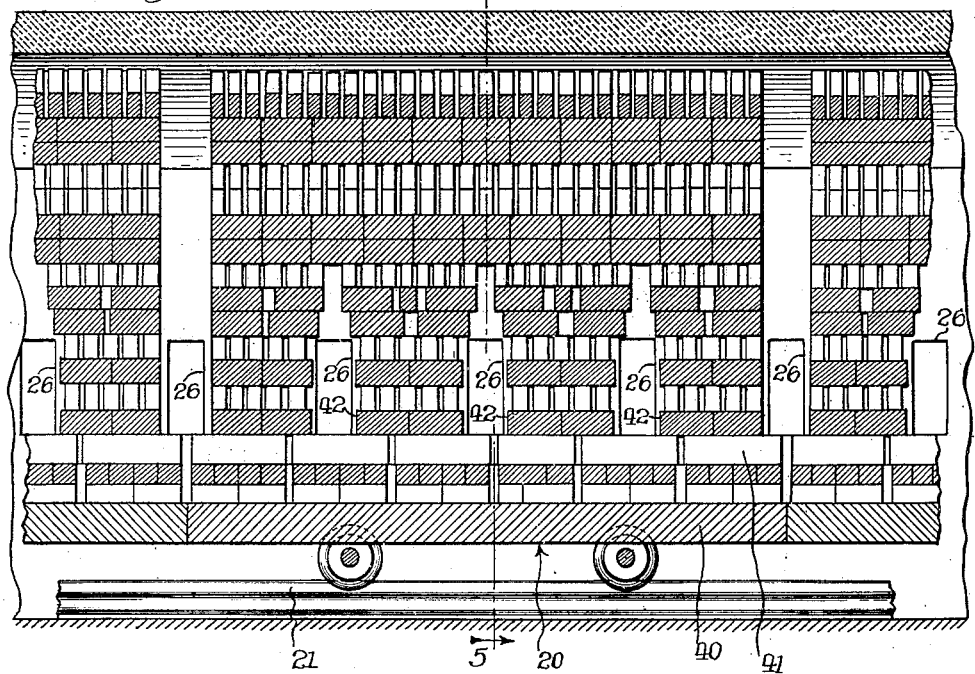
Fig. 4 is a fragmentary vertical section taken on the line 4—4 of Fig. 5.
Figure 5:
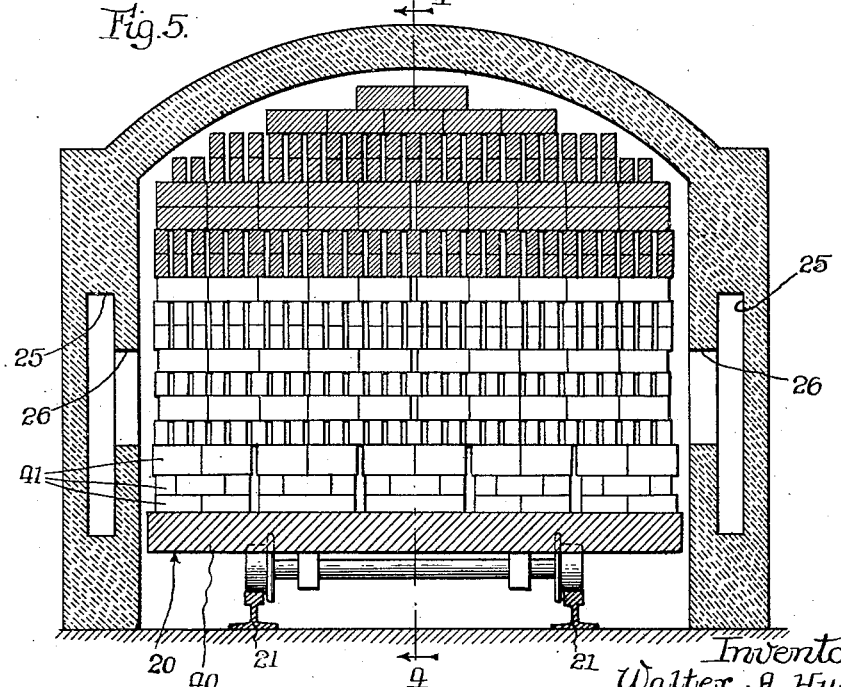
Fig. 5 is an enlarged vertical cross section taken on the line 5—5 of Fig. 1, or on the line 5—5 of Fig. 4.
Figure 12:
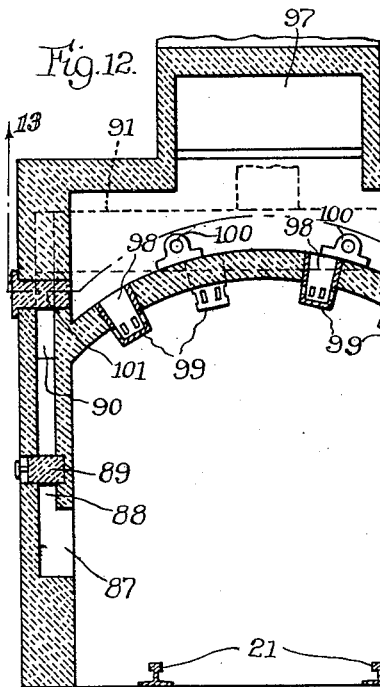
Fig. 12 is an enlarged vertical cross section taken on the line 12—12 of Fig. 1ª.
Figure 13:
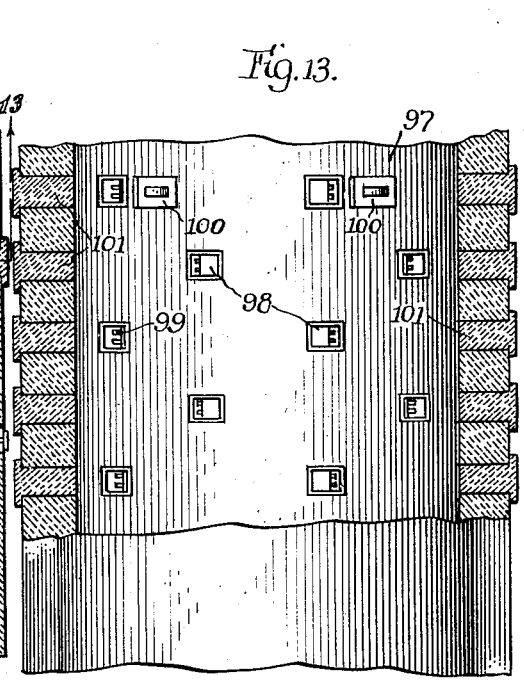
Fig. 13 is a fragmentary horizontal section taken on the line 13—13 of Fig. 12.

For the sake of illustration (see Figs. 4 and 5) the ware shown herein is brick which particularly lends itself to stacking in this manner. However, the kiln is not limited to treating brick since ware of other shape than brick may be stacked in a similar manner to yield the same results.

Each car 20 comprises a solid base 40 supported by the wheels and covered by fire-bricks 41 or other refractory material. The ware to be burned is piled on the fire-bricks 41 so that spaces are provided throughout the stack permitting the gases to come in contact with each piece of ware. In the lower part of each stack, directly over the fire-bricks 41, laterally extending passages 42 are formed, said passages being spaced apart a distance equal to the spacing of the openings 26 in the side wall of the kiln. The passages 42 may extend entirely through the stack or only part way in, the object being to provide access for the gases to be drawn from the spaces in all parts of the stack.

The cars are positioned within the kiln so that the passages 42 are alined with the openings 26 in the side walls. Thus, the gases drawn through the openings 26 will be taken from all parts of the stack so that each piece of ware will be subjected to substantially the same drying effect in a given length of time. Since the train is moved forward step by step, a car length at a time, the passages 42 are always alined with the openings 26.

The bases 40 of the cars are arranged so that they are in abutment end to end with each other, and extend so close to the side wall of the kiln that practically no circulation occurs between the ware passage over the bases 40 and the space below the bases 40. Thus, the temperature of the said space may be maintained at a low point so that bearings for the car wheels will not be overheated. A sand seal may also be provided between the side edges of the bases 40 and the side walls, if so desired.

Oxidation zone

After the ware has passed through the water-smoking zone, it must pass through a zone where the temperature and circulation of air is such that various impurities, such as sulphur combined with iron, or organic matter, will be oxidized. Without such oxidation, the ware would be of inferior quality or might be ruined through the action of the high temperature in the burning zone on such impurities.

To accomplish such oxidation, certain requirements must be met. First, there must be sufficient quantities of free oxygen present in the gases surrounding the ware, and the gases must be kept in rapid circulation to effect a rapid oxidation. Second, the temperature of the ware must lie within certain limits. No oxidation will take place if the temperature is too low. If the temperature is permitted to rise too high, the pores in the ware will close to some extent making it too dense for the oxygen to penetrate freely. Thus, oxidation would be retarded to the detriment of the ware. While some kinds of ware are not hard to oxidize, others made of certain shales and clays are more difficult to oxidize, and it is important to provide proper control of the circulation and temperature in the oxidation zone. It has been determined in practice that the most favorable temperature range for oxidation is between 750° F. and 1100° F.

While it is necessary to heat the ware gradually in both the water-smoking zone and in the burning zone, it has been found that the rate of heating which can be maintained in those two zones for certain classes of materials is greater than can be permitted in the oxidation zone, chiefly because of the range of temperature required in the oxidation zone and the length of time required for oxidation. Since the ware cannot be moved more slowly through the oxidation zone than through the other zones because all cars in the train must be moved at the same rate, the temperatures in the oxidation zone must be so controlled that the ware will be subjected to the proper temperatures for a sufficient time without decreasing the rate of movement of the train which is suitable for other zones. This requires a decrease in the temperature difference between the ends of the oxidation below that which would normally occur with the gases flowing from the burning zone.

The present invention provides means for decreasing the temperature difference between the ends of the oxidation zone so that the ware will remain for a sufficient time at temperatures within the above-mentioned range. Said means also tends to equalize the temperatures in the upper and lower portions of the ware passage, so that all the ware on any one car will be subjected to the same temperature conditions at the same time. Obviously, poor results would be obtained if the gases in passing through the oxidation zone were permitted to follow their natural courses, since the hotter gases would rise to the upper portion of the ware passage and the cooler gases would remain in the lower portion. Thus, in equalizing the temperatures in said portions, this means carries the cooler gases to the top and pulls the hotter gases down, mixing the two and at the same time causing such circulation that the free oxygen in the gases reaches all parts of the ware to eliminate the impurities.

While many different arrangements could be made to accomplish these results, the construction illustrated herein includes means for withdrawing gases from the coolest part of the oxidation zone and means for returning such withdrawn gases into the hottest part of the oxidation zone where they are mixed with the hot gases. The means for withdrawing the gases comprises a plurality of openings 50 (see Figs. 1, 2, 3, 6 and 8) through the side walls preferably at the same level as and spaced similarly to the openings 26 in the water-smoking zone. The openings 50 are situated adjacent the cooler end of the oxidation zone, that is, the end adjacent the water-smoking zone. Rising from each opening 50 is a small vertical flue 51 in the side wall which opens into a horizontal flue 52 extending the length of the oxidation zone. In each vertical flue 51, there is provided a damper 53 controlled from the exterior of the kiln for regulating the amount of gases withdrawn therethrough.

At the hotter end of the oxidation zone, that is, the end adjacent the burning zone, the horizontal flues 52 are joined by a cross flue 54 over the arch and leading to a fan 55.

The means for returning the gases withdrawn through the openings 50 is positioned adjacent the hotter end of the oxidation zone and opens into the upper or hotter part of the ware passage, preferably through the arch at that point. Said means also serves to mix the withdrawn gases with the hotter gases at that point to reduce the temperature in said upper part of the ware passage to equal the temperature in the lower part. Such mixing also provides greater circulation effecting more rapid oxidation of the ware. The withdrawal of the cooler gases at the cooler end of this zone tends to raise the temperature at said end, while the return of the cooler gases to the hotter end of said zone tends to lower the temperature at the hotter end. Thus, the temperature difference between the ends of this zone will be decreased so that the ware will be subjected to temperatures lying within the range of 750° F. to 1100° F. required for efficient oxidation.

The means for returning the gases (see Figs. 1, 2, 6 and 7) comprises in the present instance, a plurality of flues 56 extending from the fan 55 and opening into the ware passage through the arch by means of a plurality of relatively small vents 57 spaced both laterally and longitudinally. Thus, the fan 55 will force the gases through the vents 57 at a pressure causing a plurality of small jet-like streams of cooler gases to enter and mix with the hotter gases flowing immediately under the arch.

It is also to be noted that by the withdrawal and return of a portion of the gases, such portion is caused to pass through the oxidation zone twice before proceeding to the water-smoking zone. With the ware passage in the oxidation zone being of the same size as the ware passage in the burning and water-smoking zones, such repassing of a portion of the gases causes an increase in the net rate of movement of the gases in the oxidation zone. Such increase in the rate of movement also tends to decrease the temperature differences between the ends of the zone and to hold the temperatures within the required range.

In this zone, the formation of the stack of ware on the cars, as described above, also cooperates with the means for withdrawing the gases and the means for returning the gases to bring the free oxygen in the gases into contact with the pieces of ware. Since the openings 50 through which the gases are withdrawn, are at the same level as and are spaced similarly to the openings 26 in the water-smoking zone, when the cars are positioned in the oxidation zone, the laterally extending passages 42 built in the lower part of the stack are alined with the openings 50. Thus, the gases are drawn through the stack rather than around it, and are returned over the top of the stack. This affords a rapid circulation of the free oxygen around each piece of ware.

In Figs. 8 and 9, a modified form of the means for returning the gases is shown. In this form, a plurality of laterally extending longitudinally spaced slots 58 open through the arch. The fan 55 forces the gases through the slots 58 at a pressure producing sheet-like streams of cooler gases cutting into the stream of hotter gases flowing under the arch and mixing therewith. Dampers or covers 59 may be provided to regulate the extent of opening of the slots 58, access being had to the dampers through hand-holes 60 in the side-wall.

It will be evident that control of the temperatures in the oxidation zone may be had by controlling the gases withdrawn by means of the dampers 53 in the flues 51, by controlling the speed of the fan 55, or by controlling the return of the gases by the dampers 59. Both sets of dampers not only control the quantity of gases withdrawn and returned but also control the points at which said gases are withdrawn and returned.

*Burning zone*

In burning ware in a tunnel kiln, difficulty is experienced in maintaining all the ware in a stack at the same temperature. There is a tendency for the ware in the lower part of the stack to lag behind that in the upper part, as the cooler gases tend to move down to the lower part of the ware passage and the hotter gases to remain in the upper part. It is also difficult to heat the inner part of the stack as quickly as the outer part. If heat be applied, in the burning zone, from the sides of the kiln immediately over the car tops, the lower part of the ware will be heated as quickly as the upper part, but application of heat in this manner does not alone solve the problem of heating the inner part of the stack as quickly as the outside.

Heretofore, tunnel kilns have been built rather narrow so that the stack of ware will be narrow and the heat will penetrate to the center of the stack in a relatively short time. Obviously, the output of such a kiln is less than if the kiln could be made wider. And in spite of care in operation, there is danger of overburning the ware on the outside of the stack.

The present embodiment of the structure of the burning zone is designed to cooperate with the particular formation of the stacks of ware on the cars in such a manner that heat will reach all parts of the stack at substantially the same time, particularly the lower middle portion of the stack.

As described above, the ware is stacked so that there are spaces between the individual pieces of ware throughout the stack. Laterally extending passages 42 are also formed in the stack immediately over the car tops.

To supply heat in the burning zone, combustion chambers 65 (see Figs. 2, 3, 2ª and 3ª) are built in the lower part of the side-wall extending substantially the length of this zone. The fuel may be gas, oil, or coal, whichever is the most suitable in the locality in which the kiln is operated. From the combustion chambers 65, openings 66 are formed through the side wall, which openings are at the same level as and are spaced similarly to the openings 26 in the water-smoking zone and the openings 50 in the oxidation zone. Thus, the openings 66 are immediately over the car tops and will be alined with the laterally extending passages 42, so that the heat issuing from the openings 66 may pass through the passages 42 to reach the middle portion of the stack substantially as quickly as it reaches the outer portion. The outer and middle portions of the lower part of the stack of ware will then be heated at the same rate, and the hot gases will pass up through the spaces between the individual pieces of ware to heat the upper part of the stack.

Since the gases in the burning zone are drawn toward the entrance end of the kiln, there will be a stream of hot gases entering the oxidation zone in the upper part of the ware passage, the temperature of such stream being substantially that of the temperature in the adjacent end of the burning zone. This temperature would be above the upper limit, namely, 1100° F. of the range desired in the oxidation zone. But, since the vents 57 for returning the cooler gases in the oxidation are positioned adjacent the burning zone, the cooler gases issuing from these vents will cut into this stream of hot gases from the burning zone and reduce its temperature below said upper limit.

The flow of gases from the burning zone toward the entrance end of the kiln also may tend to prevent proper heating of the upper part of the ware passage in the burning zone immediately adjacent the exit end thereof. To overcome any lack of heat at this point, a combustion chamber 67 (see Figs. 2ª and 10) may be built over the arch at this point to supply heat through openings 68 in the arch.

With heat supplied at the lower part of the ware passage and carried into the center of the stack by the laterally extending passages 42 built in the ware, all parts of the ware will be heated at the same rate and danger of overburning any one part of the ware is eliminated.

*Segregation of burning zone from cooling zone*

In many tunnel kilns heretofore built, the burning zone opens directly into the cooling zone. Such construction prevents carrying the high temperatures in the burning zone completely up to the end of said zone and also prevents efficient cooling in the first part of the cooling zone, since there can be no sharp line of division between the temperatures in the different zones. This situation results in a portion of the kiln at that point being used for transition from one step in the process to the next step, where neither step is being carried on efficiently. Thus, a portion of the length of the kiln is practically useless.

Such open communication between the two zones further adversely affects the process carried on in each zone. It prevents proper control of the pressures in the zones as well as control of the temperatures therein. There is a tendency for hot gases from the burning zone to flow into the upper part of the cooling zone, preventing uniform cooling of the ware. There is also a tendency for the cooler gases from the cooling zone to enter and flow along the lower part of the ware passage in the burning zone, preventing uniform burning of the ware. It further adversely affects the fuel consumption because of the resulting inefficient operation.

The present invention contemplates the use of means for positively segregating the burning zone from the cooling zone. Thus, no transition portion in the kiln is required, the pressures and flow of gases in the two zones may be accurately controlled, resulting in proper regulation of temperatures, and the fuel efficiency is increased.

In some tunnel kilns, devices have been provided which, to some extent, effect a separation between the burning and cooling zones, but such devices have not afforded a complete segregation therebetween, and a considerable leakage and interchange of gases has taken place between the two zones, chiefly because the construction of such devices was not substantially gas-tight. Thus, the desired results were only partially attained.

In other kilns, a complete separation or isolation between the two zones is afforded but only at the expense of building the two zones in separate and distinct units, lacking a continuous passage through the two and requiring an intervening space or vestibule between the adjacent ends of the two zones.

The present embodiment of the means for segregating the two zones affords a continuous passage through the two zones permitting the entire train of ware-carrying cars to be moved by the pusher 22 at the entrance end of the kiln, and also affords a substantially gas-tight seal between the two zones when the cars are stationary. To this end, means is provided for effecting a slight spacing of the two cars at the adjacent ends of the respective zones, which spacing permits the means for segregating the zones to close off completely one zone from the other. The spacing thus provided is so small that it does not constitute a material part of the length of the kiln. Thus, the length of the kiln is less than would be necessary were the segregating means omitted, or were the burning and cooling zones built as separate units with an intervening vestibule therebetween.

The means for segregating the two zones is so constructed that it extends down to the floor of the kiln not only isolating the ware passages of the two zones but also the spaces below the car tops. In case a relatively high pressure were maintained in the ware passage of the cooling zone, there would be some leakage around the end and side edges of the cars into the space below the car tops. The gases so leaking would be heated from the ware in the cooling zone and on entering the space below the car tops would overheat the bearings of the cars.

With the segregating means extending down to the floor of the kiln, the spaces below the car tops in the two zones are isolated so that each may be held at the same pressure as the ware passage above it. Thus, such leakage would be prevented and the temperatures in said lower spaces may be such that the bearings of the cars would not become overheated.

As shown in the drawings, the means for segregating or isolating the two zones, one from the other, comprises a removable damper 70 (see Figs. 1ª, 2ª, 3ª, 10 and 11) made of refractory material and extending from the floor of the kiln up through the arch, and from the exterior of one side-wall through to the exterior of the other. Thus, the burning zone is completely blocked off from the cooling zone. To make the damper 70 substantially gas-tight, it may be notched along its bottom edge to fit over the rails 21 and a short curtain 71 (see Fig. 10) be suspended therefrom to fill the space between the rails 21. Along its side edges, externally of the side-walls of the kiln, checks 72 (see Fig. 11) may be provided to prevent leakage between the damper and the side-walls.

To support the damper, a frame is provided comprising upper and lower I-beams 73 supported by side tension members 74. Since the lower I-beam 73 is below the level of the car tops, and the upper I-beams 73 and side members 74 are positioned externally of the kiln, no part of the frame will be subjected to any high temperatures. Thus, the frame members will not be overheated and may be made of steel. To raise and lower the damper, a counterbalanced hoisting device 75 is mounted over the top of the kiln.

In the operation of the kiln, the damper is in its lowered position when the cars are stationary. When it comes time to move the train ahead a car length, the damper is raised. It then is necessary to provide a space between the next two cars, in which the damper may be inserted. To this end, a device is provided which moves the last car in the burning zone ahead until it meets the first car in the cooling zone, thus making the required space between the last two cars in the burning zone. The device further maintains said space while the entire train is moved forwardly.

While the device may be made in several different forms, the exemplary form shown herein comprises a carriage 80 running on rails 81 placed between the rails 21 supporting the cars. Mounted on the carriage 80 is an hydraulic cylinder 82 which may be raised and lowered, and which has a pair of thrust bars 83 extending from opposite ends thereof and connected to opposed pistons therein. The carriage 80 is moved to a position between the last two cars in the burning zone and the cylinder 82 is raised to the level of the axles of said two cars. The thrust bars 83 are then extended into contact with said axles and, by pressure in the cylinder 82, the last car in the burning zone is pushed forward until it meets the first car in the cooling zone. A space is thus provided between the last two cars in the burning zone.

The train of cars may then be moved forwardly carrying the carriage 80 with it, the thrust bars 83 being locked in their extended position to maintain the space between the cars. When the train is moved one car length, the space thus provided is in proper position so that the damper may be lowered therein. The thrust bars 83 are unlocked and withdrawn, the cylinder 82 is lowered, and the carriage 80 is moved back ready to repeat its operation.

Cooling zone

In the cooling of clay products, a contraction in size of the ware of considerable extent takes place. If the temperatures to which the ware is subjected during cooling cause a too rapid cooling of the exposed portions, the heat from the internal portions does not have sufficient time to flow out. This results in unequal temperatures in different portions of each piece of ware causing unequal contraction which sets up excessive strains in the ware tending to produce cracking. The prime requisite of cooling is, therefore, to reduce the temperatures of all portions of the ware equally.

Experiments have shown that the ratio between the contraction and reduction in temperature is not the same for all stages of the cooling. Thus, in clay products containing a considerable quantity of free quartz, a sudden contraction of large magnitude takes place when the ware reaches a temperature of approximately 1030° F. In silica brick, which does not contain any great amount of free quartz but does contain large quantities of tridymite and crystobalite, the temperature at which such sudden contraction takes place is much lower. The temperature at which such contraction takes place may be termed the critical temperature.

It will be evident that the rate of cooling prior to and following the critical temperature may be fairly rapid, while the rate of cooling in the neighborhood of the critical temperature must be relatively slow. That portion of the cooling zone in which the temperatures are in the neighborhood of the critical temperature may be called the critical zone. In clay products having sufficient free quartz to influence materially the contraction of the ware, the critical zone may be said to lie between the temperatures of 1200° F. and 900° F. While the present embodiment is illustrative of a kiln having such a critical zone, it will be obvious that the invention covers kilns having critical zones of different temperature limits suitable for different products.

The present invention provides a cooling zone in which the rate of cooling is controlled in a manner permitting rapid cooling both before and after the critical zone, in order to get the maximum production in the kiln, with relatively slow cooling in the critical zone. Thus, the portion of the cooling zone in which the temperatures of the critical zone exist is lengthened so that the ware may remain in said critical zone and be subjected to its temperature for a greater length of time than it would be, were a uniform rate of cooling provided throughout the cooling zone. The critical zone is lengthened to provide such greater length of time, since the greater length of time cannot be provided by slowing down the rate of movement of the ware-carrying cars in this zone alone.

In addition to so lengthening the critical zone, the temperatures in the upper and lower parts at any given point in the critical zone are equalized, since it is evident that proper control of the temperatures in the critical zone and, hence, proper cooling of the ware in said zone could not be had, unless the temperatures were so equalized.

The cooling of the ware may be effected by air introduced under pressure into the kiln adjacent the exit end thereof, preferably through the arch. To this end, a fan 85 (see Figs. 1ᵃ and 2ᵃ) is mounted on a frame extending over the arch at the exit end of the kiln to force cool, outside air into the kiln. The air is thus moved through the cooling zone under pressure toward the burning zone, the air being heated by the ware as it passes through but constantly coming in contact with hotter ware as it approaches the end of the cooling zone next to the burning zone.

When the air reaches said end of the cooling zone, it may flow out preferably through a flue 86 formed over the arch. Such withdrawn air, which is heated, may be conducted to the burners in the burning zone, there being a sufficient quantity of such air not only to support combustion but also to supply the free oxygen employed in the oxidation zone.

To control the temperatures in the critical zone, means is provided for withdrawing air from points in the critical zone adjacent to the point of critical temperature but nearer the exit end and in the lower part of the kiln where the cooler portion of the stream of air through the cooling zone tends to lie. Such withdrawal of the cooler air tends to raise the temperature at the end of the critical zone nearest the exit end and also tends to equalize the temperatures in the upper and lower portions of the critical zone, since the warmer air is drawn downwardly. Means is also provided for introducing air into the upper part of the ware passage adjacent the end of the critical zone nearest the exit end, which air is hotter than the air flowing through the ware passage at said end. Thus, such introduction of hotter air will also tend to raise the temperature at said end of the critical zone.

The air so introduced may be the air withdrawn from the lower part of the ware passage of the critical zone combined with hotter air taken from the ware passage between the critical zone and the burning zone, preferably the upper part thereof in such quantities that the mixture is hotter than the air in the critical zone nearest the exit end. Such hotter air, being withdrawn from the upper part of the cooling zone between the critical zone and burning zone, tends to increase the rate of flow of air through the critical zone so that the temperature at the end of the critical zone nearest the burning zone will be decreased.

By so decreasing the temperature at the hotter end of the critical zone and increasing the temperature at the cooler end, the length of the critical zone, or the portion of the kiln within the required limits, is increased. Thus, the ware will remain in air having temperatures within said limits for a greater time, and the cooling through the critical temperature will be safely carried on.

As shown in the drawings, the means for withdrawing the air from the lower part of the ware passage through the critical zone comprises a plurality of openings 87 (see Figs. 1ª, 2ª, 3ª and 12) formed in the side walls of the kiln at the same level as and similarly spaced to the openings 26 in the water-smoking zone, the openings 50 in the oxidation zone, and the openings 66 in the burning zone. Thus, the openings 87 will aline with the laterally extending passages 42 built in the stacks of ware on the cars, and the air withdrawn through said openings will be drawn from all parts of the stacks, and all parts of the ware will be uniformly cooled.

The openings 87 communicate with vertical flues 88, each of which is preferably controlled by a damper 89. The upper ends of the vertical flues 88 open into a pair of horizontal flues 90 extending the length of the critical zones in the respective side walls. At the end of the critical zone nearest the exit end, the horizontal flues 90 connect with a cross flue 91 from which a fan 92 draws the air.

Figure 14:
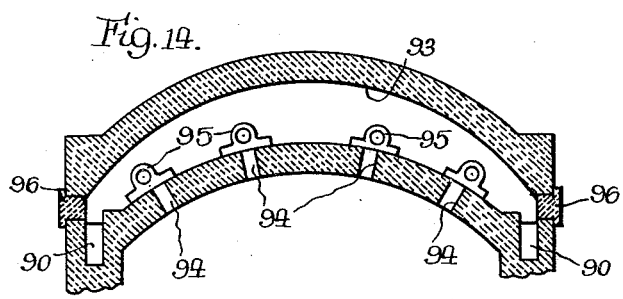
Fig. 14 is an enlarged fragmentary vertical cross section taken on the line 14—14 of Fig. 1ª.

To get hotter air from a point between the critical zone and the burning zone, which hotter air is to be combined with the cooler air withdrawn through the openings 87, the horizontal flues 90 are extended toward the burning zone, and, at a point well beyond that end of the critical zone, are connected to a cross flue 93 (see Fig. 14) which is connected with the ware passage preferably by a plurality of laterally spaced openings 94 through the arch. Each opening 94 is controlled by a damper 95, to which access may be had through a hand-hole 96 formed in the side wall. Thus, the fan 92 will draw cooler air in regulable quantities through the openings 87 and the hotter air in regulable quantities through the openings 94, and will mix the two.

The means for introducing air into the upper part of the ware passage at the end of the critical zone nearest the exit end comprises a flue 97 which is connected to the outlet side of the fan 92. In the arch under the flue 97, a plurality of openings 98 are formed, in which are mounted nozzles 99 made of heat resisting material. The latter are formed in a manner which causes the hotter air passing therethrough to mix with the stream of cooler air flowing under the arch. To this end, the nozzles 99 have a plurality of relatively small openings which throw the hotter air out in horizontal jets creating a turbulence in the stream of cooler air and resulting in a thorough mixing.

The openings 98 to the nozzles 99 may be controlled by dampers 100, to which access may be had through hand-holes 101 in the side walls. Thus, the introduction of the hotter air may be controlled.

Figure 15:
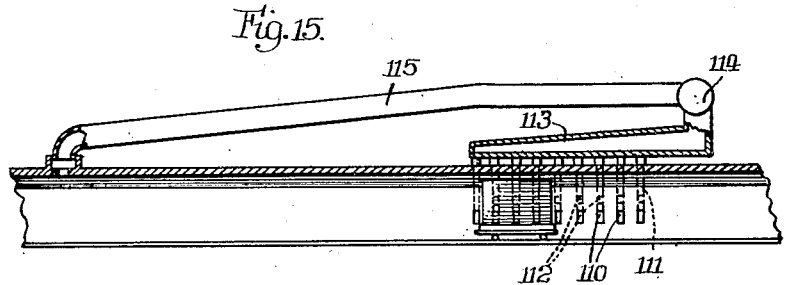
Fig. 15 is a fragmentary side elevation of a modified construction of the portion of the kiln constituting the cooling zone.

In Fig. 15, a modified form of the means for controlling the temperatures in the critical zone is shown. In this form, a part of the air is withdrawn from the lower part of the ware passage at a point longitudinally nearer the exit end of the kiln than that portion wherein the cooling ware undergoes a sudden contraction, and is by-passed around said portion. Preferably, air is withdrawn from the lower part of the ware passage at the cooler end of the critical zone through a plurality of spaced openings 110 alining with the laterally extending passages 42 built in the stacks of ware on the cars. Upwardly extending flues 111, each controlled by a damper 112, carry the air from the openings 110 to a horizontal flue 113 extending to a fan 114. The outlet of the fan 114 is connected to a flue 115 extending to the hotter end of the critical zone, and there opening into the ware passage through the arch. Thus, the coolest air is withdrawn from the cooler end of the critical zone, tending to raise the temperature at said end, and is returned to the hotter or upper portion of the hottest end of the critical zone, tending to lower the temperature at said end. This results in maintaining the temperatures within the limits required in the critical zone.

Figure 17:
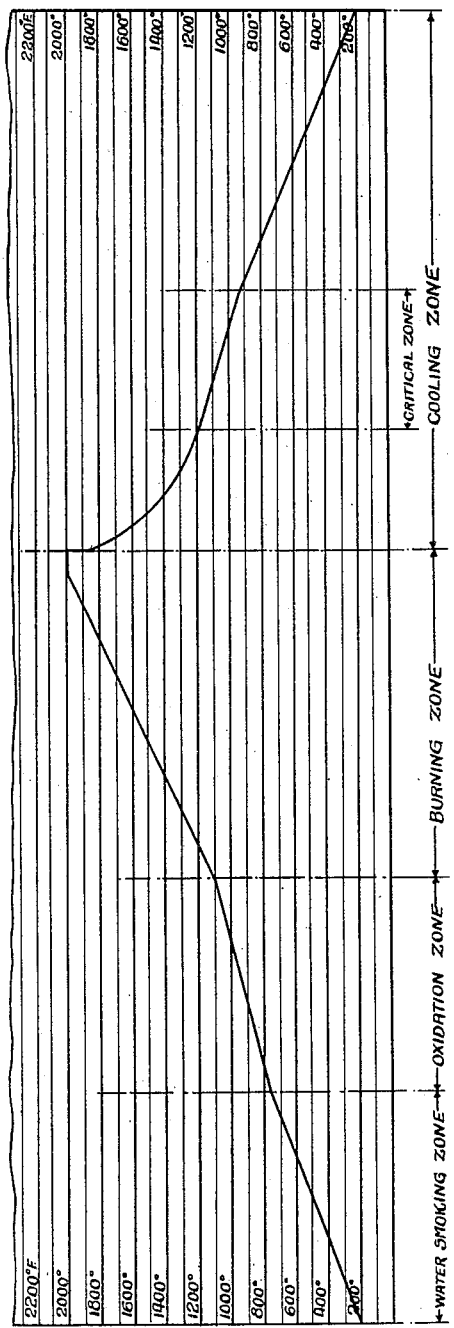
Fig. 17 is a chart showing the normal temperatures maintained in the various parts of the kiln.

Fig. 16 is a side elevation of the entire kiln showing diagrammatically the relation of the various zones, while Fig. 17 is a chart showing a typical example of the temperatures maintained in the various zones, the chart being drawn on the same longitudinal scale as Fig. 16.

From Fig. 17, it will be noted that, in the water-smoking zone, the ware may be heated fairly rapidly. Thus, the ware may be brought up to a temperature of 750° F. in this stage of the process. During the oxidation, as mentioned before, the temperatures are held between certain limits, namely, 750° F. and 1100° F. for a substantial length of time to obtain complete oxidation of the impurities in the ware. Thus, as will be noted from the chart, the rate of temperature rise in the oxidation zone is less than in the water-smoking zone.

In the burning zone, the rate of temperature rise may be increased over that in the oxidation zone, and the temperature of the ware may be carried up to its maximum just before the ware reaches the exit end of the burning zone.

When the ware is moved out of the burning zone, past the damper, and into the cooling zone, the ware undergoes a sharp drop in temperature, due to the control afforded by the damper 70, as is shown in the chart, until it reaches the critical zone where the rate of cooling is slowed up. Thus, the ware is permitted to pass through its period of greatest contraction at a slower rate of cooling than in other parts of the cooling zone. After passing the critical zone, the rate of cooling may be increased so that the ware will reach the exit end of the tunnel at a temperature only slightly above the temperature of the outside air.

I claim as my invention:

1. In a tunnel kiln having an oxidation zone, the combination of means for removing gases from the lower portion of the ware passage near one end of the oxidation zone, and means for returning said gases to the upper portion of the ware passage of said zone at points near the other end of said zone to reduce the difference in temperature between the ends of said zone.

2. In a tunnel kiln having an oxidation zone, the combination of means for removing gases from the lower portion of the ware passage in the oxidation zone near the end of lower temperature thereof, and means for returning said gases to the upper portion of the ware passage of said zone at points near the end of higher temperature of said zone to reduce the difference in temperature between the ends of said zone.

3. In a tunnel kiln, the combination of means for removing gases from the lower portion of the ware passage through a given zone near the entrance end thereof, and means for returning said gases to the upper portion of the ware passage of said zone at points longitudinally near the exit end of the ware passage of said zone to reduce the difference in temperature between the ends of said zone.

4. In a tunnel kiln, the combination of means for removing gases through both side walls adjacent the lower portion of the ware passage through a given zone and adjacent one end thereof, and means for returning said gases through the arch of said ware passage adjacent the other end thereof to reduce the temperature difference between said ends.

5. In a tunnel kiln, the combination of means for removing gases through the side walls adjacent the lower portion of the ware passage through a given zone and adjacent the end further from the source of heat, and means for returning said gases through the arch of said ware passage adjacent the end nearer the source of heat.

6. In a tunnel kiln, the combination of means for withdrawing gases from the coolest part of the ware passage through a given zone, and means for returning said gases to said ware passage in the hottest part thereof to reduce the temperature difference between said parts.

7. In a tunnel kiln, the combination of means forming a plurality of longitudinally spaced openings from the lower part of the ware passage through a given zone and adjacent one end thereof, means forming a flue connecting said openings and extending longitudinally to the other end of the ware passage of said zone, means forming a plurality of longitudinally spaced openings through the arch adjacent said other end of said ware passage, and means creating a flow of gases from said first-mentioned openings to said last-mentioned openings.

8. In a tunnel kiln, the combination of means forming a plurality of longitudinally spaced openings from the lower part of the ware passage through a given zone and adjacent one end thereof, a plurality of dampers respectively controlling said openings, means forming a flue connecting said openings and extending to the other end of the ware passage of said zone, means forming a plurality of longitudinally spaced openings through the arch adjacent said other end of said ware passage, a plurality of dampers respectively controlling said last mentioned openings, and means creating a variable flow of gases from said first-mentioned openings to said last-mentioned openings.

9. In a tunnel kiln, the combination of means for removing gases from the coolest part of the ware passage through a given zone, and means for mixing said gases with the gases in the hottest part of the ware passage of said zone comprising a plurality of relatively small openings through the arch of said passage, said openings being spaced longitudinally and laterally of said passage.

10. In a tunnel kiln, the combination of means for removing gases from the coolest part of the ware passage through a given zone, means for mixing said gases with the gases in the hottest part of the ware passage of said zone comprising a plurality of longitudinally spaced laterally extending slots opening through the arch of said passage, and a plurality of dampers respectively controlling the effective openings of said slots.

11. In a tunnel kiln, the combination of means inducing a flow of gases in one direction through the ware passage of a given zone, and means for carrying a portion of said gases back from the outlet end for the gas of said zone to the inlet end thereof.

12. In a tunnel kiln, the combination of means inducing a flow of gases in one direction through the ware passage of a given zone, means for removing a portion of said gases at a point adjacent the gas outlet end of the passage of said zone, and means for returning said portion at a point adjacent the inlet end of said passage.

13. In a tunnel kiln, having a ware passage of substantially uniform cross-sectional area, the combination of means for inducing a flow of gases through a given zone, and means for increasing the rate of longitudinal flow through said zone relative to the rate in the adjoining portions of the kiln.

14. In a tunnel kiln having a water-smoking zone, an oxidation zone, and a burning zone, with a ware passage of substantially uniform cross-sectional area through said zones, the combination of means for inducing a flow of gases therethrough, and means for increasing the rate of flow through said oxidation zone relative to the rate in the other two zones.

15. In a tunnel kiln comprising a plurality of zones and having a ware passage of substantially uniform cross-sectional area, the combination of means for inducing a flow of gases therethrough, and means for longitudinally recirculating a portion of said gases through one of said zones to increase the rate of longitudinal flow in said zone relative to the rate in the adjoining zones.

16. In a tunnel kiln having a burning zone and an oxidation zone adjoining said burning zone, the combination of means inducing a flow of gases from said burning zone through said oxidation zone, and means for introducing cooler gases into the upper part of said oxidation zone at a point adjacent said burning zone.

17. In a tunnel kiln having a burning zone and an oxidation zone adjoining said burning zone, the combination of means inducing a flow of gases from said burning zone through said oxidation zone, and means for withdrawing a part of said gases from the cooler part of said oxidation zone and returning them to the upper part of said oxidation zone at a point adjacent said burning zone.

18. In a tunnel kiln having a plurality of zones with a ware passage therethrough, the combination of means for inducing a flow of gases through said ware passage, and means for separately circulating a portion of the gases in a given zone from end-to-end thereof.

19. The method of treating ware in a tunnel kiln, which comprises moving the ware through the kiln at a predetermined rate, maintaining a relatively small temperature difference between the ends of a portion of said kiln, and rapidly circulating the gases in said portion to oxidize the impurities in the ware.

20. The method of treating ware in a tunnel kiln, which comprises moving the ware through the kiln at a predetermined rate, inducing a flow of hot gases through said kiln, reducing the temperature difference between the ends of a portion of said kiln below that normally caused by said flow, and effecting a rapid circulation of the gases between and around the ware in said portion to oxidize the impurities in the ware.

21. The method of treating ware in a tunnel kiln having a water-smoking zone, an oxidation zone, and a burning zone, which comprises moving the ware through said zones in the order named, inducing a flow of hot gases in a direction opposite to the movement of said ware at a rate maintaining predetermined temperatures in said burning and water-smoking zones, and reducing the temperature difference between the ends of said oxidation zone below that normally caused by said rate of flow.

22. The method of treating ware in a tunnel kiln comprising a water-smoking zone, an oxidation zone, and a burning zone, which comprises moving the ware through said zones in the order named, inducing a flow of hot gases in a direction opposite to the movement of said ware at a rate maintaining predetermined temperatures in said burning and water-smoking zones, and increasing the rate of flow in said oxidation zone.

23. The method of treating ware in a tunnel kiln comprising a water-smoking zone, an oxidation zone, and a burning zone, which comprises moving the ware through said zones in the order named, inducing a flow of hot gases in a direction opposite to the movement of said ware, and mixing cooler gases with the gases entering said oxidation zone from said burning zone.

24. The method of treating ware in a tunnel kiln comprising a water-smoking zone, an oxidation zone, and a burning zone, which comprises moving the ware through said zones in the order named, inducing a flow of hot gases in a direction opposite to the movement of said ware and removing gases from the coolest part of said oxidation zone and mixing them with the gases entering said oxidation zone from said burning zone.

25. The method of oxidizing ware in a tunnel kiln, which comprises stacking the ware on cars with openings into the middle of the stack extending laterally adjacent the bottom of the stack and with vertically extending spaces, moving said cars through the kiln step by step, inducing a flow of hot gases through said kiln in a direction opposite to the travel of said cars, withdrawing gases at a predetermined point in said kiln from said openings to cause a flow downward through said stack, and returning said gases into the top of said kiln at a point more advanced relative to the movement of said cars.

26. The method of treating ware in a tunnel kiln, which comprises stacking the ware on cars with large lateral passages into the middle of the bottom of the stack, causing a relative flow of gases between said passages and corresponding openings in the side walls of the kiln, and moving said cars through said kiln with a step-by-step movement.

27. The method of treating ware in a tunnel kiln, which comprises stacking the ware on cars with large lateral passages into the middle of the bottom of the stack, said passages being uniformly spaced longitudinally of the car, causing a flow of heated gases through correspondingly spaced openings in the side wall of the kiln, and moving said cars in steps equal to a multiple of the distance between adjacent openings.

28. In a tunnel kiln comprising a burning zone and a cooling zone in end-to-end relation, the combination of a train of ware-carrying cars extending through said zones, means for moving said train, means constituting a seal between said zones and extending between the cars at the adjoining ends of said zones, and means operable when said train is moved for creating a space between two adjoining cars for the introduction of said sealing means.

29. In a tunnel kiln comprising burning and cooling zones in end-to-end relation, the combination of a train of ware-carrying cars extending through said zones, means for pushing the train through said zones, means for sealing one zone from the other and extending between the cars at the adjoining ends of said zones, and means for separating one car of the train from the adjoining car to locate said car a sufficient distance from said adjoining car to permit the introduction of said sealing means and for transmitting the push of the train to said one car.

30. In a tunnel kiln, the combination of a train of ware-carrying cars extending through said kiln, means for moving said train, means for sealing one portion of the kiln from another and extending between the cars, and means for progressively creating spaces between the cars for the insertion of said sealing means and for transmitting motion from one train section to another while maintaining said space.

31. In a tunnel kiln comprising a burning zone and a cooling zone in end-to-end relation, the combination of a train of ware-carrying cars extending through said zones, means for moving said train, means forming a seal between said zones and extending between the cars at the adjoining ends of said zones, and means for moving the end car in the burning zone forwardly into contact with the end car in the cooling zone and for maintaining, when said train is moved, a space between said end car in the burning zone and the next car therein for the insertion of said sealing means.

32. In a tunnel kiln comprising a burning zone and a cooling zone in end-to-end relation, the combination of a train of ware-carrying cars extending through said zones, a pusher for moving said cars forwardly, a movable partition extending laterally through the kiln and forming a substantially gas-tight seal between said zones, said partition extending between the cars at the adjoining ends of said zones, and a carriage adapted to be inserted between the end car in said burning zone and the next adjoining car in said zone for moving the end car forward and for maintaining a space between said adjoining cars for the insertion of said partition after the train has been moved forward a car length.

33. In a tunnel kiln having a burning zone, the combination of means causing the flow of hot gases into said zone, means causing the flow of said gases from one end of said zone, and means completely sealing the other end of said zone to prevent any inflow of cold gases at the bottom and any outflow of hot gases at the top.

34. The combination of a tunnel kiln having a ware passage therethrough, and means forming a seal between one portion of said kiln and another, said means comprising a partition made of heat-resisting material extending across and co-extensive with the cross-sectional area of said ware passage, and frame members supporting and surrounding said heat-resisting material and positioned externally of said ware passage.

35. In a tunnel kiln having side walls, an arch over said side walls, and a train of ware-carrying cars therein, said walls, arch and cars forming a ware passage, movable means for sealing one portion of said ware passage from another comprising, in combination, a partition made of heat-resisting material extending through the side walls and arch and between two adjoining cars, frame members supporting said partition and positioned externally of said side walls and arch, and means mounted over said arch for raising and lowering said partition and frame members.

36. In a tunnel kiln having a burning zone and a cooling zone, the combination of means producing a flow of air under pressure in said cooling zone, means for producing a flow of gases in said burning zone, a train of ware-carrying cars in said zones, and means for completely segregating one zone from the other permitting maintenance of the same pressures below said cars in the respectively zones as the pressures over said cars.

37. In a tunnel kiln having a cooling zone, the combination of means for controllably withdrawing air from the lower portion of the ware passage of said cooling zone at a point on the cooler side of the point of critical temperature of the ware, means for controllably withdrawing air from a hotter part of said cooling zone, and means for mixing said withdrawn air and returning it adjacent said point of critical temperature to retard the rate of cooling adjacent the point of critical temperature and to equalize the temperatures at the top and bottom of the ware passage at said point.

38. In a tunnel kiln having a ware passage through a cooling zone, the combination of means for controllably withdrawing air through the side walls at the lower part of said ware passage and nearer the exit end of said passage than the point of critical temperature, means for controllably withdrawing air through the arch adjacent the entrance end of said passage, means for mixing said withdrawn air, and means for returning said air through the arch adjacent the point of critical temperature and for mixing said air with the air flowing through said passage at said point.

39. In a tunnel kiln having a ware passage through a cooling zone, the combination of means for withdrawing air from the lower part of said ware passage at a point nearer the exit end of said passage than the point of critical temperature, and means for returning said air to said ware passage at a point nearer the entrance end of said ware passage than said point of critical temperature.

40. In a tunnel kiln having a cooling zone, the combination of means for withdrawing air from the lower part of said zone adjacent the point of critical temperature, means for withdrawing air from a hot point in said zone, and means for mixing said withdrawn air and for returning it adjacent the point of critical temperature, said last-mentioned means including nozzles, each extending below the arch of the kiln and having a plurality of horizontally extending openings causing the air to flow in horizontal jets to mix with the stream of air flowing under the arch.

41. The method of cooling ware in the cooling zone of a tunnel kiln after burning therein, which comprises moving the ware through said zone at a predetermined rate, generating a current of air in said zone flowing from the exit end toward the entrance end, reducing the temperature difference between the ends of a given portion of said zone below that normally caused by said current, and producing a circulation between the top and bottom portions of said current to equalize the temperatures thereof.

42. The method of cooling ware in the cooling zone of a tunnel kiln, which comprises moving the ware through said zone at a predetermined rate, generating a current of air in said zone flowing from the exit end toward the entrance end at a predetermined rate tending to maintain a uniform rate of temperature change throughout the length of the cooling zone, varying said current in the portion of the cooling zone adjacent the critical range of the ware to lengthen the portion of said zone having temperatures within said range, and circulating the air between the top and bottom parts of said current in said portion to equalize the temperatures thereof.

43. The method of cooling ware in the cooling zone of a tunnel kiln, which comprises moving ware through said zone at a predetermined rate, generating a current of air in said zone flowing from the exit end toward the entrance end, mixing air removed from a point adjacent to and on the cooler side of the point of critical temperature of the ware and from another point on the warmer side of said point of critical temperature in amounts sufficient to produce a temperature equal to said critical temperature and returning said mixed air at said point of critical temperature.

44. The method of treating ware in a tunnel kiln, which comprises stacking the pieces of ware on cars with relatively large openings extending laterally into the middle of the bottom of the stack and with small vertically extending spaces between the pieces of ware, moving said cars through the kiln, burning said ware in one portion of said kiln, and drawing air through said openings to cause a flow downward through said stack and thereby equalize the cooling rate of the upper and lower portions of the stack.

45. In a tunnel kiln comprising a water-smoking zone, an oxidation zone and a burning zone in end-to-end relation with a ware passage through said zones, the combination of means for producing a longitudinal flow of hot gas from the burning zone through the oxidation zone, means for withdrawing a part of said gas from the ware passage in the portion of said oxidation zone near the water-smoking zone, and means for returning said withdrawn gas to the ware passage in that portion of the oxidation zone near the burning zone.

46. In a tunnel kiln having an oxidation zone, the combination of means for withdrawing gas from the ware passage adjacent the end of the oxidation zone nearer the entrance end of the kiln, and means for returning said withdrawn gas to the ware passage adjacent the end of the oxidation zone farthest removed from the entrance of the end of the kiln.

47. The method of treating ware in a tunnel kiln, which comprises stacking the ware on cars with large lateral passages into the middle of the bottom of the stack, causing a relative flow of gases between said passages and openings in the side walls of the kilns, and moving said cars through said kiln with a step-by-step movement to bring said passages in the ware on each car successively in the same position relative to said openings.

48. In a tunnel kiln having a cooling zone, the combination of means for passing a current of air through said cooling zone in a direction opposite to the direction of movement of the ware, and means for removing a part of said air from the lower part of the ware passage at a point longitudinally nearer the exit end of the kiln than that portion wherein the cooling ware undergoes a sudden contraction, and for by-passing said withdrawn air, thereby reducing the rate of flow of air through said portion and retarding the rate of cooling therein.

49. The method of cooling ware in the cooling zone of a tunnel kiln which comprises moving the ware through said zone at a predetermined rate, generating a current of air in said zone flowing in a direction opposite to the movement of the ware, and adding warmer air to the air flowing to an intermediate portion of said zone to retard the rate of cooling of the ware in said portion.

50. In a tunnel kiln, the combination of a train of ware-carrying cars extending through said kiln, means for moving said train, means for sealing one portion of the kiln from another and extending between the cars, and means operable when said train is moved for creating a space between two adjoining cars for the introduction of said sealing means.

51. In a tunnel kiln having a plurality of zones, the combination of a train of ware-carrying cars extending through said zones, means for moving said train, means for sealing one zone from the rest of the kiln and extending between the cars, and means for creating spaces between the cars for the insertion of said sealing means, said space-creating means permitting all cars to be moved simultaneously by said train-moving means.

WALTER A. HULL.